July 23, 1940.  W. S. HALFPENNY  2,208,976

ROD OR SHAFT PACKING

Filed June 29, 1938  2 Sheets-Sheet 1

Inventor:
William S. Halfpenny
By Dodge and Sons,
Attorneys

July 23, 1940.　　　　W. S. HALFPENNY　　　　2,208,976
ROD OR SHAFT PACKING
Filed June 29, 1938　　　2 Sheets-Sheet 2

Inventor:
William S. Halfpenny
By
Attorneys

Patented July 23, 1940

2,208,976

UNITED STATES PATENT OFFICE 2,208,976

ROD OR SHAFT PACKING

William S. Halfpenny, Baltimore, Md., assignor to Koppers Company, Pittsburgh, Pa., a corporation of Delaware Application June 29, 1938, Serial No. 216,552

4 Claims. (Cl. 288—13)

This invention pertains to rod packings of the metallic type, the construction and advantages whereof will be hereinafter set forth in detail.

The main object of the invention is to produce a sectional packing wherein the component elements are formed of metals which present different wearing characteristics, to wit, one being softer than the other, and means to prevent the softer element or elements from wearing away faster than the harder element or elements once the softer element or elements are fully seated. The elements are so shaped or contoured that the danger of leakage through the joints existing between the parts is reduced to a minimum. More specifically, certain elements of each unit of the packing will be formed of iron or other hard material such as steel, while the remaining elements of the same unit will be formed of a relatively softer metal or alloy, such as brass or bronze, which will tend to fill in any voids or rough places that may be present upon a shaft. Furthermore, the facewise contact of the various bronze and iron elements of each unit ensures a close sealing fit and reduced friction between such elements, this for the reason just stated in connection with a rod, to wit, the softer metal will fill the voids in the harder metal until the latter becomes "slick."

Again, the elements of each unit structure are so formed that when assembled and positioned with reference to a shaft they maintain their relative position with the joints of the elements out of alignment, while still permitting the elements to be urged to and held in sealing relation with the shaft and this without the employment or presence of any special anti-shifting means as stakes or pins.

Figure 1:
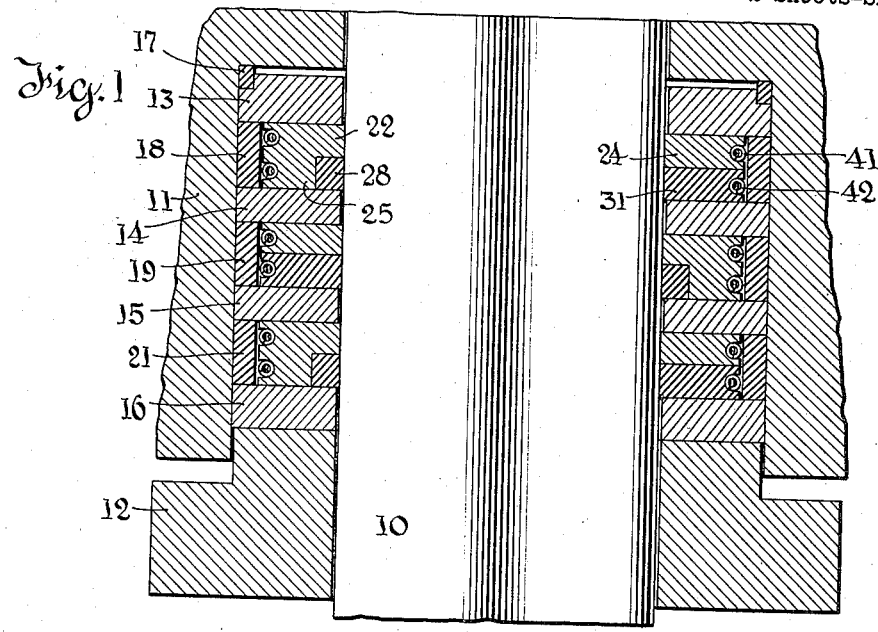
Figure 2:
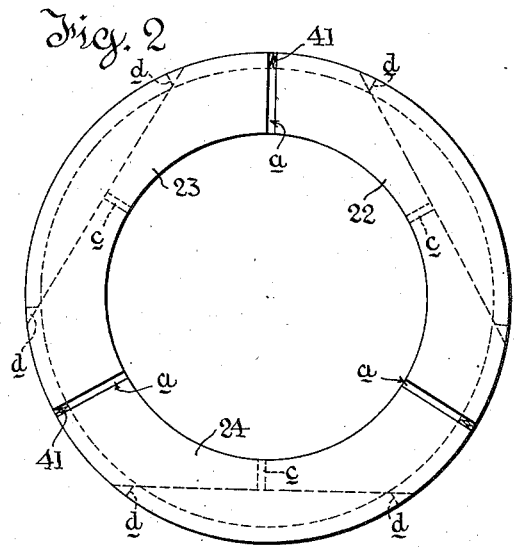
Figure 3:
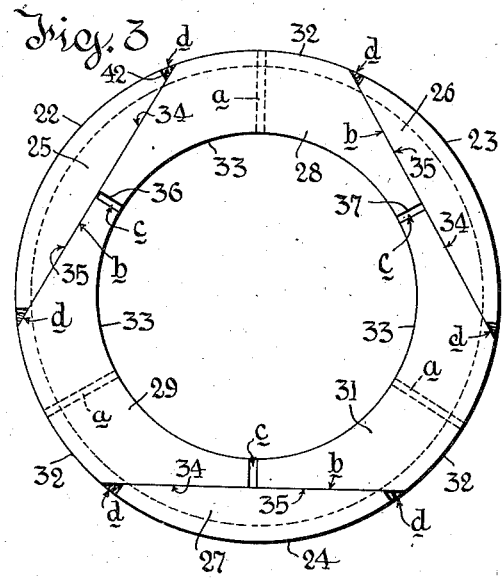
Figure 4:
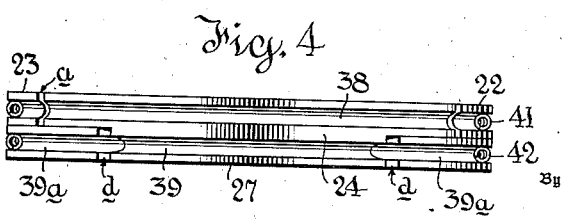
Figure 5:
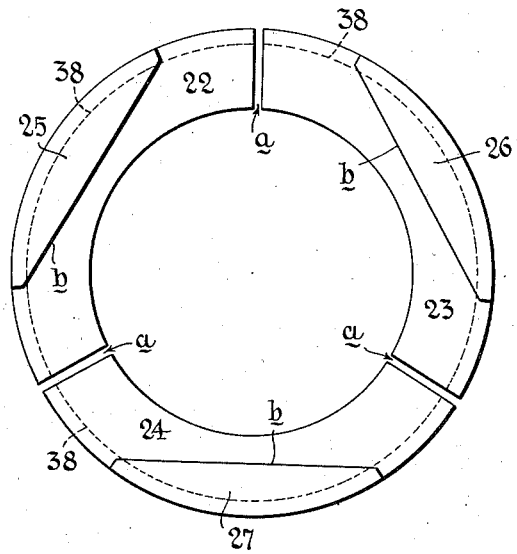
Figure 7:
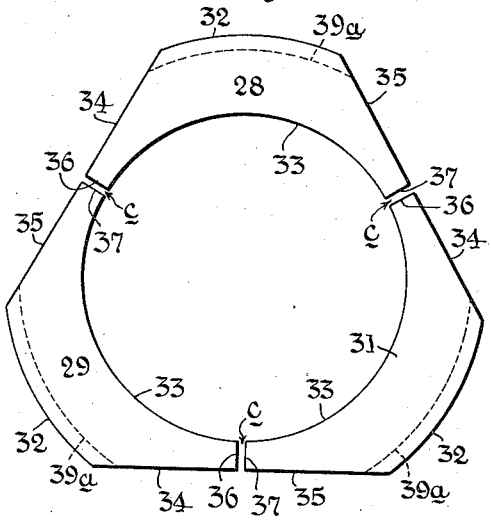
Figure 6:
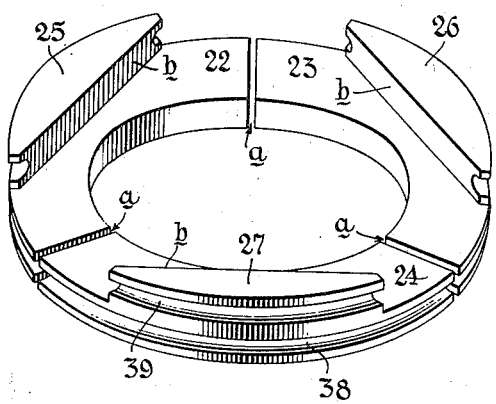
Figure 8:
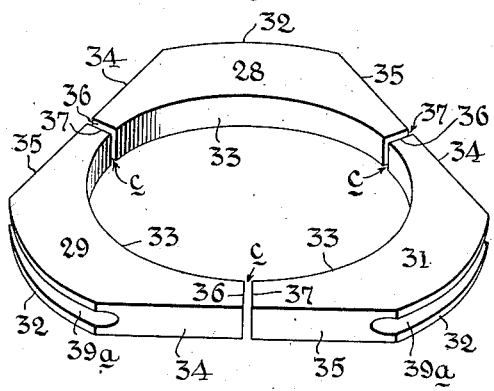

With these and other objects in view, reference is had to the annexed drawings, wherein:

Figure 1 is a longitudinal sectional view of the packing assembly with a portion of the rod in full lines;

Fig. 2, a top plan view of one of the units;

Fig. 3, a view of the same unit as seen from the under face thereof;

Fig. 4, a side elevation of the unit with the garter springs which are employed to urge the elements into contact with the rod, broken away;

Fig. 5, a plan view of the three elements which form one section of layer of a packing unit;

Fig. 6, a perspective view of the same;

Fig. 7, a plan view of the companion section or layer of the unit composed of three elements; and Fig. 8, a perspective view of the same.

In the drawings, 10 denotes a shaft, either rotatable or reciprocable; 11, a fixed portion of a cylinder or housing, and 12, the usual packing gland. Thus, the pressure acts in a downward direction with reference to the structure, as illustrated in Fig. 1.

As above indicated, the packing preferably comprises a series of units of like form and arrangement held in assembled relation within the housing in sealing relation with the shaft. It will be appreciated, however, that a single composite unit might be employed.

Three units are shown in Fig. 1. These units are separated and are held in proper relation with reference to each other and to the housing 11 by a series of disc-like rings 13, 14, 15 and 16, which are preferably formed of iron and can be either continuous or split. The opening in each ring is slightly greater than the diameter of the shaft, as shown in Fig. 1, hence there is no drag on the rod or shaft imposed by said ring-like elements as the shaft moves in and out or is rotated.

The innermost ring, denoted by 13, is rabbeted on its upper face, and seated within such cutaway portion is a gasket or ring 17 produced from a relatively soft material, such as copper or lead, which, as will be seen upon reference to Fig. 1, bears directly against the inner wall of the recess formed in the member 11.

Spacer rings 18, 19 and 21, are located between the separator elements or rings, forming recesses or grooves for housing the sealing units hereinafter to be described. The rings may be either solid or split, and of segmental form. These spacer rings are of a height sufficient to allow a slight clearance between them and the adjacent elements of the sealing units. In other words, while there is a close fit, still the arrangement and proportioning of the parts is such that the sealing elements of the various units may be moved inwardly into contact with the shaft 10. The various sealing units are alike throughout and a description of one will, therefore, suffice for all. While it is preferred to employ iron or ferrous elements working in conjunction with elements formed of bronze, brass or other alloy, the important aspect of the invention is that two different materials are used and are so related that the harder or slower wearing of the two materials limits the rate of wear of the softer or faster wearing of the two materials, and because of this limitation of wear, assures the maintenance of the seal which would be lost if the softer material were allowed to wear away at its normal, that is, its normally faster, wearing rate.

Stated somewhat broadly, each unit may be said to comprise two series of segmental elements, one series being superimposed upon the other with their joints offset, and one series of segments being provided with integrally formed segmental flanged portions which extend longitudinally of the unit and cooperate with the segments of the other series to maintain the segments of the two series against relative rotative or angular movement.

Referring first to the segments having the longitudinally extending portions, reference is had more specifically to Figs. 1, 3, 4, 5 and 6. As will be best seen upon reference to Fig. 6, there are three segmental portions, 22, 23 and 24, which are alike in form and have their inner edge or face formed upon a radius equal to that of the shaft 10. The segments are of such length that they will not entirely close against each other at their ends when assembled about the shaft, or in other words, the ends are not radially disposed but lie in parallelism so as to leave a space $a$ between the ends of adjacent segments.

Each of the members 22, 23 and 24 has formed integrally therewith a longitudinally projecting segmental element, designated 25, 26 and 27, respectively, the outer curved face whereof stands in alignment with the outer curved face of the segment from which the projection extends. The chord or secant face of each of the projecting segmental portions is denoted by $b$.

The second series of segments is best seen upon reference to Figs. 2, 3, 7 and 8. It comprises three elements, 28, 29 and 31, the inner edges or faces whereof are curved so that they will take a fair bearing upon the shaft when worn in.

The segments 28, 29 and 31 are alike in form and their outermost edge or face is curved as at 32, the curvature being the same as that of the outer edge or face of the segments 22, 23 and 24. The inner edge or face of each of the segments 28, 29 and 31 is curved as at 33, the curvature being formed upon a radius the same as or slightly different than that of the inner face of the other segments, 22, 23 and 24. Extending from each side of the curved face 32 is a flat face, these faces being denoted generally by 34 and 35, respectively, which are parallel to the tangent to the inner curved surface 33 and terminate in straight cross faces 36 and 37.

When the parts are assembled, the faces 34 and 35 stand in alignment and bear directly against the chord or secant faces $b$ of the integral segmental projections heretofore referred to. This form is common to all of the segments 28, 29 and 31. As is the case with the segmental elements 22, 23 and 24, the segments 28, 29 and 31 are so proportioned with reference to the size of the shaft that when assembled about the same, the end faces 36 and 37 stand in parallelism and are separated from each other as indicated at $c$. When assembled, the series of segments 22, 23 and 24 are seated upon the segments 28, 31 and 29, respectively, with the rabbeted or flat faces 34, 35, contacting the chord or secant faces $b$ of the segmental projections 25, 26 and 27, so that the parts are then in the position shown in Figs. 2, 3 and 4.

As will be seen upon reference to the various figures and more particularly Figs. 3 and 5, the ends of the segments 25, 26 and 27 are cut off so that when the parts are assembled there is a space, as $d$, left between such ends and the flat faces of the segments 28, 29 and 31.

The segments 22, 23 and 24 have formed in their outermost edge a groove 38. A groove 39 is likewise formed in the outer curved face of each of the segmental projections 25, 26 and 27. A groove 39$^a$ is formed in the outer curved face 32 of the various segments 28, 29 and 31, these latter grooves aligning with the grooves 39 when the parts are in their assembled position, as clearly illustrated in Fig. 4. Garter springs 41 and 42 extend about the grooves thus formed and serve to move the segmental elements of the two series inwardly into contact with the shaft, the springs being stressed sufficiently to ensure proper movement of the segments at all times.

When the parts are assembled with reference to the shaft and properly positioned within the housing 11, the joints of the segments of one series are initially displaced with reference to those of the other. Hence, leakage is cut down to the minimum. The lugs 25, 26 and 27 being integral with their respective segmental elements, shifting of the parts with reference to each other is precluded and thus joint alignment is inhibited.

As best shown in Fig. 1, each assembled unit made up of the two series of segments is mounted with the series composed of the segments 22, 23 and 24 on the high pressure side, and the series composed of the segments 28, 29 and 31 on the low pressure side of the assembled unit. This is important, as will be seen from an inspection of Figs. 2 and 3. Pressure fluid from the high side flowing along the rod 10 enters the slots $a$ and thus acts outside of the assembled unit to contract the unit, but is prevented from leaking past the unit because the overlapping portions of the two series of segments produce seals at every point. Observe, for example, that the slots $c$ are blanked in every instance. Thus, the pressure against which the seal is produced actually develops a contracting force on the unit as the result of its flow to the periphery of the unit through the slots $a$.

By providing the clearances $a$ and $c$ between the segments of the two series, provision is made for inward movement of all the segments by the springs to take up or compensate for wear, as well as to allow the segments to move under the influence of a vibratory movement of the shaft. Under any and all movements of the segmental members the joints $a$ and $c$ will be maintained out of alignment by reason of the presence of the integrally formed lugs or flanges 25, 26 and 27 which, while allowing the necessary movement of the elements, also brings about a minimum number of joints.

If the elements 22, 23 and 24 are made of bronze or other relatively soft alloy and the elements 28, 29 and 31 are made of iron or a relatively hard alloy, the softer elements can not wear away faster than the harder elements, but in view of the fact that it is impossible to machine with such accuracy as to ensure a perfect seat of the component elements of the packing against the rod or shaft and between the chord faces of the flanges 25, 26 and 27 of the elements 22, 23 and 24 and the flat faces 34 and 35 of the elements 28, 31 and 29, the bronze or softer portions of the packing may come into a seat or bearing first. However, after this nominal or slight wear, in coming to a seat, no further wear of the softer elements can take place without the same amount of wear of the harder elements by virtue of the design of the component elements previously described.

This arrangement of the relatively hard and relatively soft materials is very important. It will be observed that the slow wearing segments 28, 29 and 31 engage, along the lines b, the overhanging lugs 25, 26 and 27 formed integrally with the softer segments 22, 23 and 24. This characteristic of positively limiting the contraction of the softer element by the contraction of the harder element is very important, because the softer element cannot wear away faster than does the harder element and will consequently wear at the same rate. Further, since the high pressure fluid entering through the slots a on the high pressure side reacts against the periphery of both elements to contract them, the positive engagement is maintained, irrespective of the action of the springs. In fact, the engagement of the two elements is increased by the pressure against which the seal acts. Hence, the units are never forced apart and the softer units can never be induced to wear away faster than do the harder elements. This positive engagement can be produced in various ways, but the construction shown has demonstrated utility in actual service.

The packing may, of course, be employed with a rotatable shaft or a reciprocating rod, and the terms rod and shaft as used herein and in the claims are to be given the same meaning.

It will be understood that it is quite easy in manufacturing the packing heretofore described, to produce the bronze elements, for instance, so that they will contact the rod before the iron elements and thus polish the rod, particularly if the same were a reciprocating one, and this before the harder elements take up the load. On the other hand, it might be advisable to have the harder elements come into a seat as rapidly as possible and perhaps withhold pressures, particularly in a reciprocating installation, before the relatively soft portions of the packing come into a seat and then start to polish the rod. Such relationships may be effectuated by varying the proportions of the component elements, as above indicated.

What is claimed is:

1. In a rod packing, the combination of a plurality of segmental elements having their inner faces curved and producing when assembled a circular opening with a definite clearance between the ends of the elements; a second series of elements imposed upon the first series, said second series having their inner faces curved to produce when assembled, with approximately the same definite clearance between the ends of the elements as in the first series, a circular opening substantially the same as and not larger than that produced by the first series; means projecting from and formed as an integral part of the elements of the first series, said means seating upon portions of the elements of the second series and in such relation thereto as to maintain the elements of the first series against radial movement inwardly without a corresponding movement of the elements of the second series, the first series of segmental elements being produced from a material relatively soft as compared to that of the other series; and two contracting springs, one coacting with both sets of segments and the other coacting with the first set of segments, said springs tending to move the segments inward toward the axis of the rod.

2. A rod packing, comprising in combination a plurality of arcuate sections assembled end to end to produce a ring with spaces between the ends of the sections, each of said arcuate sections having an integrally formed flanged portion adjacent its periphery extending axially of the packing; a second ring formed of sections assembled end to end with spaces between the ends and disposed in facewise relation with the first ring, the peripheral portions of each of the sections of said second ring being formed to receive and positively engage the axially extending flanged portions of the first ring, whereby the sections of the first ring are prevented from moving radially inward without a similar movement of the sections of the second ring, the sections of the first ring being produced from a metal relatively soft as compared to that of the arcuate sections of said second ring, and the parts being so proportioned and arranged that the segments of the second ring will first contact the rod about which the various segments are assembled.

3. In a rod packing, the combination of a plurality of segmental elements having their inner faces curved and producing when assembled a circular opening with a fixed clearance between the ends of the elements, said segmental elements being produced from a relatively soft material; a second series of elements imposed upon the first series seated upon portions of the elements inner faces curved to produce when assembled, with approximately the same fixed clearance between the ends of the elements as in the first series, a circular opening approximately the same as and not larger than that produced by the first series, said second series being produced from material harder than that of the first series; integrally formed projections on the elements of the first series seated upon portions of the elements of the second series in such relation as to maintain the elements of the first series from moving radially inwardly without a corresponding movement of the elements of the second series, whereby the elements of the second series will wear in against a rod or shaft with which the packing is to effect a seal at least as soon as does the first series.

4. In a rod packing, the combination of at least two series of segmental elements, the two series being disposed in facewise relation in contact with each other, one series being formed of a relatively hard material and the other series being formed of a relatively soft material, at least one of said series having projections which engage the other series on surfaces capable of developing thrust between segments of the two series in generally radial direction, the projections overlapping the intervals between the segments of such other series to preclude leakage through the same and the softer series reacting inward upon the harder series in the areas of such engagement to constrain both series to contraction resulting from wear at a rate limited by the wear of the relatively hard material so that relative radial motion of the two series incident to wear of the sealing faces thereof is precluded and a seal is maintained irrespective of such wear.

WILLIAM S. HALFPENNY.

CERTIFICATE OF CORRECTION.

Patent No. 2,208,976.                                          July 23, 1940.

WILLIAM S. HALFPENNY.

It is hereby certified that error appears in the printed specification of the above numbered patent requiring correction as follows: Page 3, second column, line 33, claim 3, for the words and syllable "series seated upon portions of the ele-" read --series, said second series having their--; and that the said Letters Patent should be read with this correction therein that the same may conform to the record of the case in the Patent Office.

Signed and sealed this 27th day of August, A. D. 1940.

Henry Van Arsdale, (Seal)                                                    Acting Commissioner of Patents.